(12) United States Patent
Armbruster et al.

(10) Patent No.: US 9,618,740 B2
(45) Date of Patent: Apr. 11, 2017

(54) MICROMIRROR AND MANUFACTURING METHOD FOR AT LEAST ONE MICROMIRROR WHICH IS SITUATABLE OR SITUATED IN A MICROMIRROR DEVICE

(71) Applicant: Robert Bosch GmbH, Stuttgart (DE)

(72) Inventors: Simon Armbruster, Wannweil (DE); Helmut Grutzeck, Kusterdingen (DE); Joerg Muchow, Ruetlingen (DE); Frederic Njikam Njimonzie, Reutlingen (DE); Johannes Baader, Wannweil (DE); Stefan Pinter, Reutlingen (DE); Rainer Straub, Ammerbuch (DE); Zoltan Lestyan, Martonvasar (HU)

(73) Assignee: ROBERT BOSCH GMBH, Stuttgart (DE)

( * ) Notice: Subject to any disclaimer, the term of this patent is extended or adjusted under 35 U.S.C. 154(b) by 53 days.

(21) Appl. No.: 14/553,707

(22) Filed: Nov. 25, 2014

(65) Prior Publication Data

US 2015/0153566 A1    Jun. 4, 2015

(30) Foreign Application Priority Data

Nov. 29, 2013    (DE) .................. 10 2013 224 631

(51) Int. Cl.
G02B 26/08    (2006.01)

(52) U.S. Cl.
CPC ....... *G02B 26/0841* (2013.01); *G02B 26/085* (2013.01); *G02B 26/0858* (2013.01)

(58) Field of Classification Search
CPC ............ G02B 26/0841; G02B 26/0833; G02B 26/085; G02B 26/0858; G02B 26/105; G02B 26/0816
USPC ...................... 359/199.1–199.4, 200.6–200.8, 359/224.1–224.2
See application file for complete search history.

(56) References Cited

U.S. PATENT DOCUMENTS 7,567,367 B2    7/2009  Ji
8,547,619 B2 *  10/2013  Moidu ............... G02B 26/0841
                                                  359/224.1

* cited by examiner

*Primary Examiner* — James Phan
(74) *Attorney, Agent, or Firm* — Gerard Messina (57) ABSTRACT

A micromirror for a micromirror device includes: a mirror side; and a back side which is directed away from the mirror side, at least one central area of the back side having at least one surface which is plane parallel to the mirror side, the back side being shaped in such a way that on two opposite sides of the central area, a side area having at least one side surface of the back side in each case, which is curved and/or oriented inclined toward the mirror side borders on the central area of the back side, and a height of the micromirror continuously decreasing starting from the central area along a cross section of the micromirror, which runs through the central area and the two side areas.

15 Claims, 6 Drawing Sheets

MICROMIRROR AND MANUFACTURING METHOD FOR AT LEAST ONE MICROMIRROR WHICH IS SITUATABLE OR SITUATED IN A MICROMIRROR DEVICE

BACKGROUND OF THE INVENTION

1. Field of the Invention

The present invention relates to a micromirror for a micromirror device and a micromirror device, a manufacturing method for at least one micromirror which is situatable or situated in a micromirror device, and a manufacturing method for a micromirror device.

2. Description of the Related Art

Different specific embodiments of micromirror devices are described in U.S. Pat. No. 7,567,367 B2. Each of the micromirror devices has a mirror element which is displaceable about at least one axis of rotation and which has a reflective mirror side and a back side which is plane parallel thereto. The displaceability of the particular mirror element about the at least one axis of rotation is supposed to be ensurable with the aid of springs, each of which runs from an inner surface of a frame part to a side surface of the contacted mirror element which is situated between the mirror side and the back side.

BRIEF SUMMARY OF THE INVENTION

The present invention provides micromirrors for micromirror devices which are displaceable almost deformation-free or having comparably little deformation of their mirror sides. With the aid of the present invention, in particular, the deformation of the mirror sides (during the displacement of the micromirror about the at least one axis of rotation) may be kept so small that a surface of the mirror side which is illuminated by a light spot/laser spot hardly shows any deformation. The micromirrors/micromirror devices according to the present invention may thus be used to project an image, a good image quality of the projected image being ensured. Accordingly, the micromirrors/micromirror devices according to the present invention may also be advantageously used to scan a surface.

The present invention additionally facilitates the manufacture of the advantageously employable micromirrors/micromirror devices. As is explained in greater detail below, a process sequence for manufacturing micromirrors/micromirror devices may be simplified with the aid of the present invention. In addition, the costs which are incurred when manufacturing micromirrors/micromirror devices may thus be reduced.

In one advantageous specific embodiment of the micromirror, an outer surface of the back side which is plane parallel to the mirror side borders on the particular side area in each case on a side of the two side areas which is directed away from the central area in each case. In the case of a design of this type of the back side of the micromirror, the mirror side may, in particular, be designed to have a relatively large surface, a good displaceability of the micromirror about the at least one predefined axis of rotation being ensured with little deformation of the mirror side.

For example, a first section of the cross section which is limited to the central area may have a first length which is at least 20% of a total length of a total section of the cross section. The first length, in particular, be at least 25% of the total length, preferably at least 33% of the total length, in particular at least 40% of the total length. As is explained in greater detail below, a comparably small deformation of the mirror side is implemented with the aid of a comparably wide design of the central area even when the micromirror is displaced from its starting position by a comparably large displacement angle.

In one preferred specific embodiment, the micromirror is structured out of a silicon substrate. In this case, the side surfaces of the back side may be 111 crystal planes. A micromirror designed in this way may be manufactured relatively easily and cost-effectively.

The advantages described above are also implemented in a micromirror device having at least one micromirror of this type, a holder, and at least one spring via which the micromirror is connected to the holder in such a way that the micromirror is displaceable about at least one predefined axis of rotation in relation to the holder with the aid of a force which is applied thereto by an actuator which is situated internally in the micromirror device and/or provided externally.

In one advantageous specific embodiment of the micromirror device, the at least one spring is anchored at the back side of the micromirror. The at least one spring may be, in particular, fixedly bonded at the back side of the micromirror. This ensures that during the displacement of the micromirror about the at least one predefined axis of rotation, deforming forces are kept away from the mirror side.

The above-described advantages are also ensured in the case of an adapted manufacturing method for at least one micromirror which is situatable or situated in a micromirror device.

In particular, the shaping of the back side may take place by etching the back side out of a silicon substrate or out of an SOI wafer. In this way, it is possible to use cost-effective materials to manufacture the micromirror. Moreover, techniques which are known and may be carried out cost-effectively may be used to manufacture the micromirror.

The etching of the back side out of the silicon substrate or out of the SOI wafer preferably takes place by using potassium hydroxide (KOH). In this case, it may be automatically ensured that the 111 crystal planes are structured as the desirable side surfaces of the back side.

Alternatively or additionally, the etching of the back side may take place out of the silicon substrate having an implanted etch stop layer or out of the SOI wafer, an outer surface of the back side which is plane parallel to the mirror side and borders on the particular side area in each case being additionally formed on each side of the two side areas which is directed away from the central area. It is thus possible to obtain a preferred shape of the back side with the aid of a method which is comparably easy to carry out.

The advantages described above may also be ensured with the aid of the adapted manufacturing method for the micromirror device.

For example, the at least one spring may be fixedly bonded at the back side anodically or eutectically. In this way, the micromirror and the at least one spring may be initially formed separately from one another and subsequently bonded to one another with the aid of a bonding process which is easy to carry out.

In another advantageous specific embodiment, the micromirror is molded from a sodium-containing glass. If desired, the at least one spring may be fixedly anodically bonded at the back side of the micromirror which is molded from the sodium-containing glass. In this way, other method steps, which are easy to carry out, for separately manufacturing the micromirror and the at least one spring may be carried out.

DETAILED DESCRIPTION OF THE INVENTION

Figure 1A:
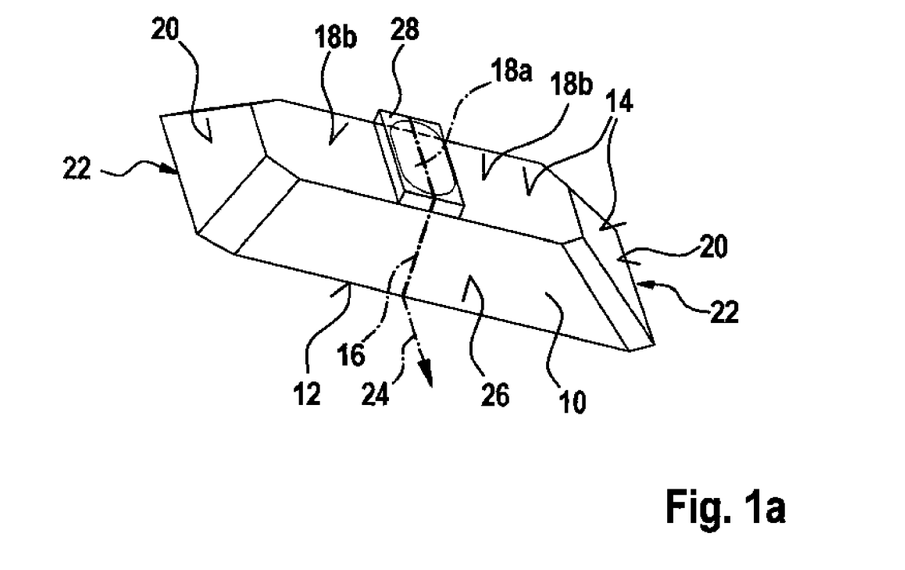
FIGS. 1a and 1b show a schematic illustration of one first specific embodiment of the micromirror and its dynamic deformation.
Figure 1B:
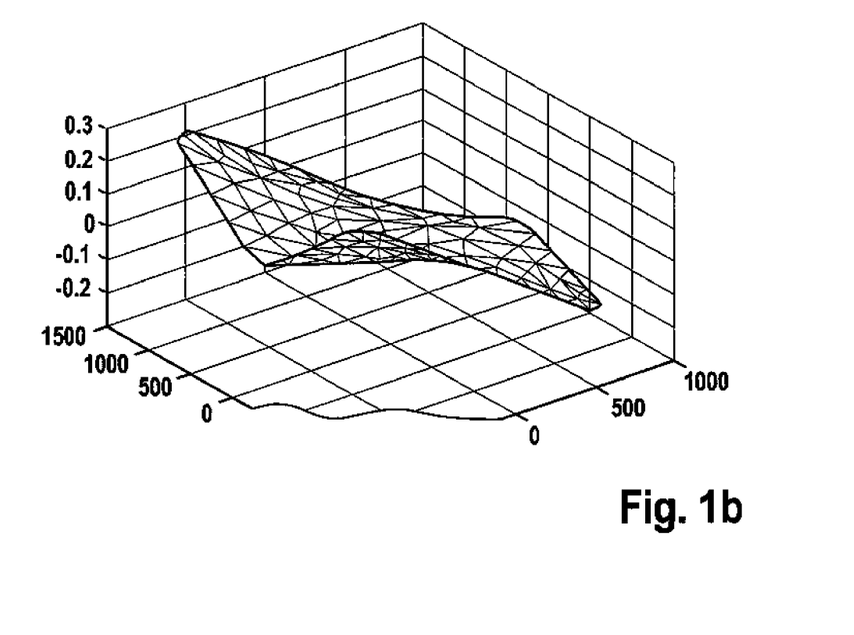

FIGS. 1a and 1b show a schematic illustration of one first specific embodiment of the micromirror and its dynamic deformation.

Micromirror 10 which is schematically represented in FIG. 1a has a mirror side 12 and a back side 14 which is directed away from mirror side 12. Mirror side 12 is covered using a reflective coating and/or polished (not illustrated). Mirror side 12 is thus designed in such a way that an incident light beam (not illustrated) may be reflected. Mirror side 12 may, in particular, be understood to mean a smooth surface.

Back side 14 has a central area including at least one surface 18a and 18b which is plane parallel to mirror side 12. In the specific embodiment of FIGS. 1a and 1b, micromirror 10 is designed symmetrically with regard to a plane of symmetry 16 which intersects mirror side 12 and back side 14. The central area of back side 14 is thus positioned centrally. A symmetry of micromirror 10 is, however, not required. For this reason, micromirror 10 may optionally also be designed asymmetrically. It is thus not necessary for the central area of back side 14 to be understood to mean an area which is positioned centrally at back side 14.

Back side 14 is moreover shaped in such a way that on two opposite sides of the central area, a side area which has at least one side surface 20, which is curved and/or oriented inclined toward mirror side 12, of back side 14 in each case borders on the central area of back side 14. A height of micromirror 10 along a cross section of micromirror 10 which runs through the central area and the two side areas decreases continuously starting from the central area. (The height of micromirror 10 is preferably to be understood to mean a width of micromirror 10 which is oriented perpendicularly to mirror side 12.)

The shape of the side areas may also be described by saying that at least one tangent is definable for each side area, the maximum angle of inclination of the at least one tangent of each side area being maximally 80° with regard to a plane of mirror side 12. The maximum angle of inclination of the at least one tangent of each side area is advantageously maximally 50°, in particular maximally 30°, with regard to the plane of mirror side 12. (The at least one angle of inclination is in this case to be understood to mean the angle between the at least one tangent and the plane of mirror side 12.) Likewise, the shape of the side areas may also be described as a tapering which extends away from the central area in each case.

Back side 14 of micromirror 10 of FIGS. 1a and 1b is in particular shaped in such a way that the height of the cross section defined above decreases continuously starting from the central area up to side ends 22 of micromirror 10 which are spaced apart (the farthest from this central area). Advantageous possibilities for the formation of the shape of back side 14 which is described in the paragraph above is explained in greater detail below.

Micromirror 10 may be used in a micromirror device (not illustrated). For this purpose, micromirror 10 may be connected to a holder of the micromirror device via at least one spring of the micromirror device in such a way that micromirror 10 is displaceable about at least one predefined axis of rotation 24 in relation to the holder with the aid of a force applied thereto. Micromirror 10 is preferably connected via the at least one spring in such a way that the side areas of micromirror 10 are situated at two different sides of axis of rotation 24. The advantages of this type of suspension of micromirror 10 are explained in greater detail below.

For example, at least one joining compound, such as in particular a bonding material and/or an adhesive, via which the at least one spring is fastened/anchored at back side 14 of micromirror 10, may be applied to the at least one plane-parallel surface 18a and 18b of the central area, in particular to plane-parallel surface 18a situated most centrally. It is pointed out, however, that the usability of micromirror 10 is not limited to an anchoring of the at least one spring at back side 14 of micromirror 10.

As is illustrated in FIG. 1a as an example, predefined axis of rotation 24 may be situated in plane of symmetry 16 of micromirror 10. Inertia of a total mass displaced about an axis of rotation increases quadratically with an increasing distance of its partial masses from the particular axis of rotation. Micromirror 10, whose height decreases with increasing distance from plane of symmetry 16, therefore has a comparably low inertia during a displacement about axis of rotation 24 situated in plane of symmetry 16. By forming side surfaces 20 which are curved and/or oriented inclined toward mirror side 12, in particular, the inertia of micromirror 10, which occurs during the displacement about axis of rotation 24 situated in plane of symmetry 16, may be advantageously reduced as compared to a displaceable mirror having a constant thickness. Micromirror 10 is thus displaceable about axis of rotation 24 situated in plane of symmetry 16 already against a restoring force of the at least one spring with the aid of comparably little force. In particular, micromirror 10 may be easily put into oscillation about axis of rotation 24 situated in plane of symmetry 16.

A stiffness of a total mass which is displaced about an axis of rotation decreases to the power of three in relation to its height. Micromirror 10 therefore has a particularly advantageous stiffness during the displacement about axis of rotation 24 situated in plane of symmetry 16. In this way, micromirror 10 is not only displaceable about axis of rotation 24 at comparably little inertia, but additionally allows almost undeformed mirror side 12 to be used to deflect a light beam/laser beam with the aid of displaced micromirror 10.

In addition to above-described surfaces 12, 18a, 18b, and 20, micromirror 10 may also have side edge surfaces 26 (front surfaces), each of which is preferably centrally intersected by plane of symmetry 16. Side edge surfaces 26 (front surfaces) may be oriented perpendicularly to surfaces 12, 18a, and 18b. Likewise, side edge surfaces 26 (front surfaces) may, however, also be oriented inclined toward surfaces 12, 18a, and 18b at an angle of inclination which is unequal to 90°.

Optionally, at least one central base 28 may be designed at the central area. Multiple plane-parallel surfaces 18a and 18b which have different heights in relation to mirror side 12 may thus be designed at the central area. In the case of an implementation/a connection of micromirror 10 at a micromirror device, the at least one spring of the micromirror device may be anchored, in particular, at central base 28. The implementability of micromirror 10 is, however, not limited to it being equipped with central base 28.

FIG. 1b shows an FEM simulation for illustrating a dynamic deformation of mirror side 12 of micromirror 10 (having a comparably small maximum height of maximally 200 μm) during the displacement about axis of rotation 24 situated in plane of symmetry 16 (by bending the at least one spring which is anchored at back side 14). It is apparent that a dynamic deformation of mirror side 12, which occurs during the displacement of micromirror 10 about axis of rotation 24, is comparably small. In particular, the dynamic deformation of mirror side 12 may be minimizable to under 0.1 μm. The dynamic deformation of mirror side 12 may thus be approximately 1/10 of a wavelength of light which is reflected at mirror side 12.

The light incident on mirror side 12 is thus reflectable without a spot expansion. Micromirror 10 may therefore be advantageously used to project an image having a comparably high resolution. The low dynamic deformation of mirror side 12 may also be used for other applications of micromirror 10.

It is pointed out, however, that the symmetric position of micromirror 10 in relation to axis of rotation 24 is to be interpreted only as an example. An asymmetric position of (symmetric or asymmetric) micromirror 10 in relation to axis of rotation 24 may even be advantageous in certain applications for the purpose of balancing the oscillation system.

Figure 2A:
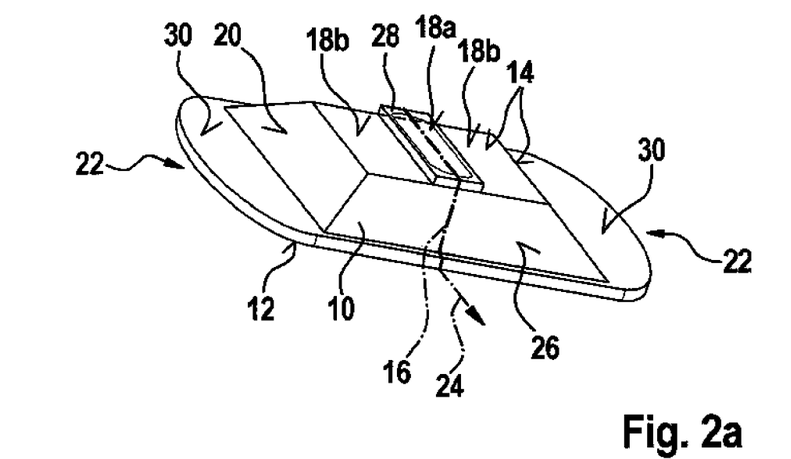
FIGS. 2a and 2b show a schematic illustration of one second specific embodiment of the micromirror and its dynamic deformation.
Figure 2B:
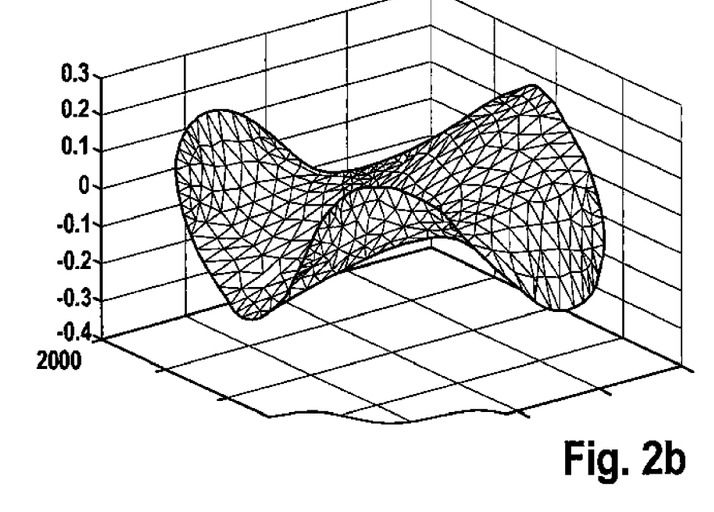

Micromirror 10 which is schematically illustrated in FIG. 1a is structured out of a silicon substrate. Side surfaces 20 of back side 14 of micromirror 10 are 111 crystal planes. In this way, the desirable shape of back side 14 is easily shapeable by applying a mask/etch protective layer to the at least one plane-parallel surface 18a and 18b and by subsequent back-side etching, in particular by using KOH (potassium hydroxide). In order to structure the back side of micromirror 10, standard method steps may thus be utilized. In addition, a silicon substrate is a relatively cost-effective starting material. Micromirror 10 is therefore manufacturable easily and comparably cost-effectively. Moreover, existing layer tensions in the present cross section of the silicon substrate do not result in any noticeable static deformations due to bimetal effects. An undesirable, additional deformation of mirror side 12 due to bimetal effects/layer tensions is thus not to be expected. FIGS. 2a and 2b show a schematic illustration of one second specific embodiment of the micromirror and its dynamic deformation.

Micromirror 10 which is schematically illustrated in FIG. 2a has a back side 14 which (as an addition to the at least one plane-parallel surface 18a and 18b and the at least two side surfaces 20) has, on each side of the two side areas which is directed away from the central area, an outer surface 30 of back side 14 in each case which is plane parallel to mirror side 12. Each of the two outer surfaces 30 borders on the adjacent side areas of back side 14. Reference is otherwise made to the previously described micromirror device with regard to the components of the specific embodiment of FIGS. 2a and 2b.

As is apparent based on FIG. 2b, micromirror 10 of FIG. 2a which is displaced about axis of rotation 24 (situated in plane of symmetry 16) has a relatively small dynamic deformation at its mirror side 12 despite its comparably large mirror side 12. Thus, the advantages of a comparably small moment of inertia and a relatively small dynamic deformation are also implemented in the specific embodiment of FIGS. 2a and 2b.

Micromirror 10 which is schematically illustrated in FIG. 2a may, for example, be manufactured from an SOI wafer. In order to structure micromirror 10 out of the SOI wafer, back-side etching, e.g., by using KOH (potassium hydroxide), may be carried out. Surfaces 18a, 18b, and 20 are preferably formed from the substrate of the SOI wafer, a mask/etch protective layer being applied to the at least one plane-parallel surface 18a and 18b prior to structuring out of side surfaces 20. An oxide layer which is situated between the substrate and a semiconductor layer of the SOI wafer may be used as the etch stop layer. In this way, outer surfaces 30 may be prevented from being etched through or etched away with the aid of the oxide layer. (In this case, the height between outer surfaces 30 and mirror side 12 is generally (almost) identical to a layer thickness of the semiconductor layer of the SOI wafer.) The semiconductor layer which was trenched free at outer surfaces 30 may be subsequently used as a carrier layer for the reflective coating applied to the front side of the SOI wafer.

As an alternative to an SOI wafer, a silicon substrate having an implanted etch stop layer may also be used as the starting material for micromirror 10 of FIG. 2a. Micromirror 10 may also be prevented from being etched through/etched away at outer surfaces 30 during a back-side etching with the aid of an implanted etch stop layer (e.g., by using KOH and a mask/etch protective layer on the at least one plane-parallel surface 18a and 18b). The height between outer surfaces 30 and mirror side 12 may be established in this case as/via the distance of the implanted etch stop layer from a front side of the silicon substrate. A pn etch stop may, for example, be introduced as the implanted etch stop layer from the front side of the silicon substrate. An n doping having a concentration above $10^{20}$ to $10^{22}$ (optionally introduced from the front or from the back side of the silicon substrate) may also be used as the implanted etch stop layer. Subsequent mirror side 12 may be formed before or after that.

As is apparent in FIG. 2a, side edges surfaces 26 (front surfaces) may border on side surfaces 20. In order to generate a (sharp) edge between side edge surfaces 26 (front surfaces) and side surfaces 20, at least one corner compensation structure may also be applied during the formation of back side 14 to the substrate side to be etched prior to the back-side etching. (Therefore, back side 14 may also be formed having edges which are oriented obliquely to plane of symmetry 16.)

FIGS. 3a through 3d show cross sections of further specific embodiments of the micromirror.

Micromirrors 10 which are schematically represented in FIGS. 3a through 3d based on their cross sections each have a back side 14 having exactly one surface 18, which is plane parallel to mirror side 12, and having side surfaces 20 which laterally border thereon (opposite to plane-parallel surface 18) and are curved and/or oriented inclined toward mirror side 12. The height of each micromirror therefore constantly has a first value h1 along a first section A1, which is limited to the central area, of a cross section, which runs through the central area and both side areas. Along a second section A2 of the cross section (having a (maximum) length L1), which follows first section A1 and which is limited to one of the two side areas, the height continuously, in particular constantly, decreases from first value h1 to a smaller second value h2 starting from the central area. Second value h2 may, in particular, go toward zero.

Figure 3A:
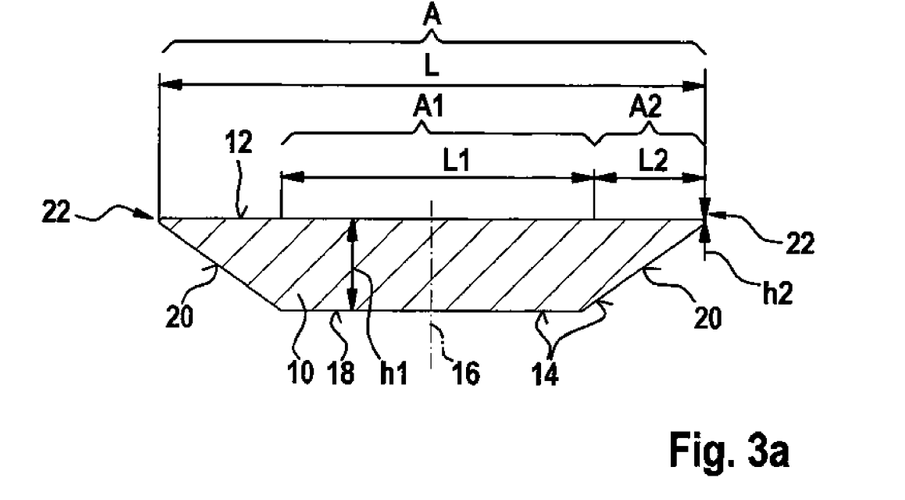
FIGS. 3a through 3d show cross sections of further specific embodiments of the micromirror.
Figure 3B:
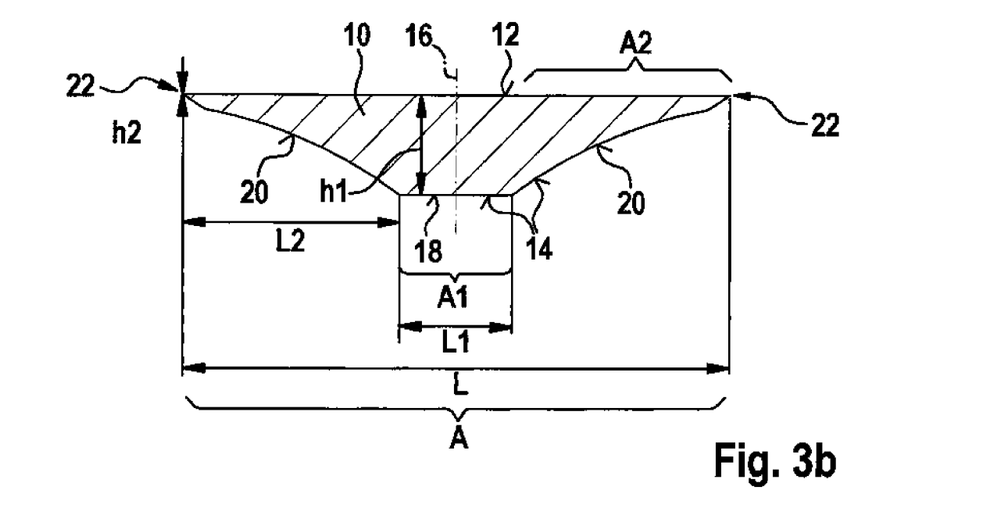
Figure 3C:
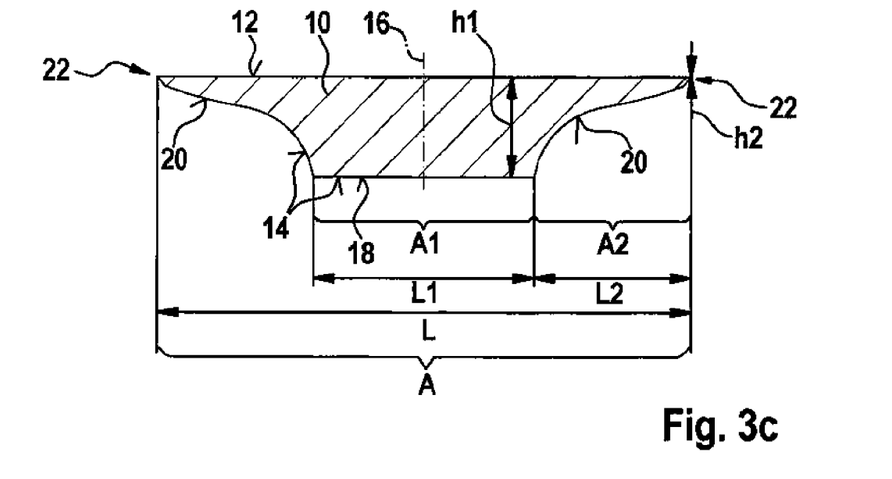
Figure 3D:
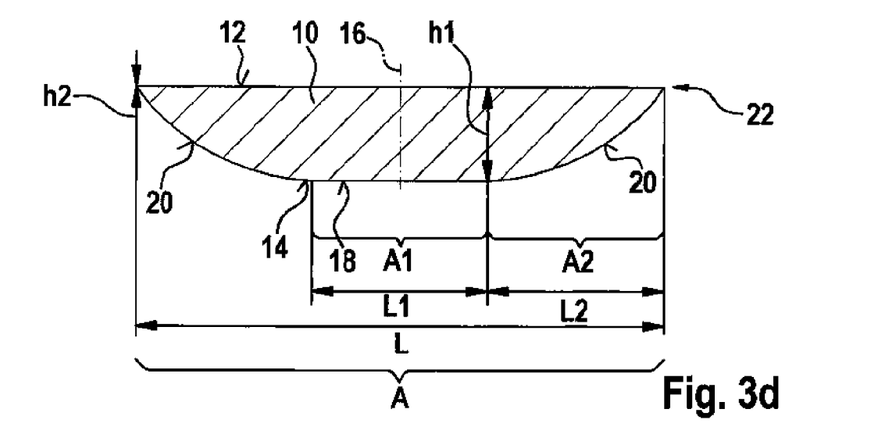

In second section A2, height h may decrease linearly (FIG. 3a) having a strictly monotonically increasing curve (FIGS. 3b and 3c) or having a strictly monotonically decreasing curve (FIG. 3d). Side surfaces 20 may thus have a beveled, concave, or convex shape.

First section A1 of the cross section may have a first (maximum) length L1 which is at least 20% of a total length L of a total section A of the cross section (between particular lateral ends 22 of micromirror 10). First (maximum) length L1 of first section A1 may advantageously be at least 25% of total length L of total section A, e.g., at least 33% of total length L of total section A, in particular at least 40% of total length L of total section A. This ensures an advantageous, small dynamic deformation of the micromirror of FIGS. 3a through 3d.

All back sides 14 mentioned above are implementable with the aid of simpler method steps and more cost-effectively as compared to the conventional back-side reinforcements of mirrors from the related art. In particular, back sides 14 described above may be shaped with the aid of a one-time trenching process/etching step. The manufacturing tolerances which are desirable on back sides 14 do not pose additional requirements for their manufacture.

Each of micromirrors 10 described above is connected/connectable via at least one spring to a holder of a micromirror device in such a way that micromirror 10 is displaceable in relation to the holder about the at least one axis of rotation 24 (or optionally about a different axis of rotation) situated in plane of symmetry 16 with the aid of a force applied thereto. The at least one spring may, for example, extend at least partially along back side 14 in a folded/meandering shape. Optionally, each micromirror 10 may be additionally connected/connectable to the holder via an intermediate frame and at least one external spring in such a way that micromirror 10 is also displaceable about a further axis of rotation.

For displacing each micromirror 10, an actuator may be used which is situated in the micromirror device and/or provided externally. Since a plurality of different actuators, e.g., electric actuators and/or magnetic actuators, may interact with the micromirror device, the employable actuator is not discussed here in greater detail.

Figure 4:
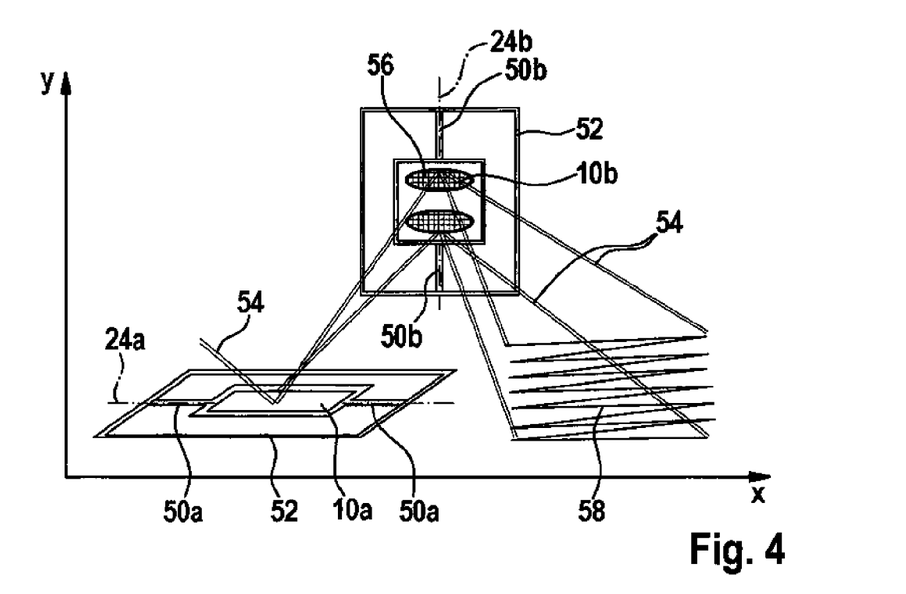
FIG. 4 shows a schematic illustration of one specific embodiment of the micromirror device.

FIG. 4 shows a schematic illustration of one specific embodiment of the micromirror device.

The micromirror device which is schematically illustrated in FIG. 4 has two micromirrors 10a and 10b, each of which is connected to schematically illustrated holder 52 with the aid of two assigned springs 50a or 50b in each case. A light beam 54 which is to be deflected with the aid of the micromirror device first strikes a first micromirror 10a of the two micromirrors 10a and 10b, which is displaceable about a first axis of rotation 24a (by bending springs 50a). Light beam 54 is directed to a second micromirror 10b of the two micromirrors 10a and 10b with the aid of first micromirror 10a. Second micromirror 10b is displaceable about a second axis of rotation 24b (by bending springs 50b) which is oriented inclined toward first axis of rotation 24a. In particular, first axis of rotation 24a and second axis of rotation 24b may be oriented perpendicularly to one another. In the specific embodiment of FIG. 4, first axis of rotation 24a is horizontal axis x, while second axis of rotation 24b is vertical/gravity axis y, as an example. It is pointed out, however, that the orientation of axes of rotation 24a and 24b illustrated in FIG. 4 is to be interpreted only as an example.

Each of the above-described micromirrors may be used for second micromirror 10b. Second axis of rotation 24b of second micromirror 10b is situated in its plane of symmetry (not illustrated), for example. Optionally, first micromirror 10a may also be designed to have one of the above-described advantageous back sides 14. Accordingly, first micromirror 10a may also be optionally oriented in such a way that first axis of rotation 24a is situated in its plane of symmetry (not illustrated).

Preferably, the displacement of first micromirror 10a about first axis of rotation 24a takes place statically, so to speak. In contrast, second micromirror 10b is displaceable preferably resonantly about second axis of rotation 24b. Due to advantageous back side 14 of second micromirror 10b, its natural frequency may be easily established to a desirable frequency value, in particular within a frequency range between 10 kHz to 50 kHz.

Due to its advantageous design, micromirror 10b, which is put in resonance, moreover has maximally a total deformation of 0.1 µm. Surface 56 of its mirror side 12, which is illuminated with the aid of incident light beam 54, thus has a negligible deformation. It may be ensured in this way that an image which is reflected onto light-incident surface 58 with the aid of micromirrors 10a and 10b has a good image quality.

Figure 5:
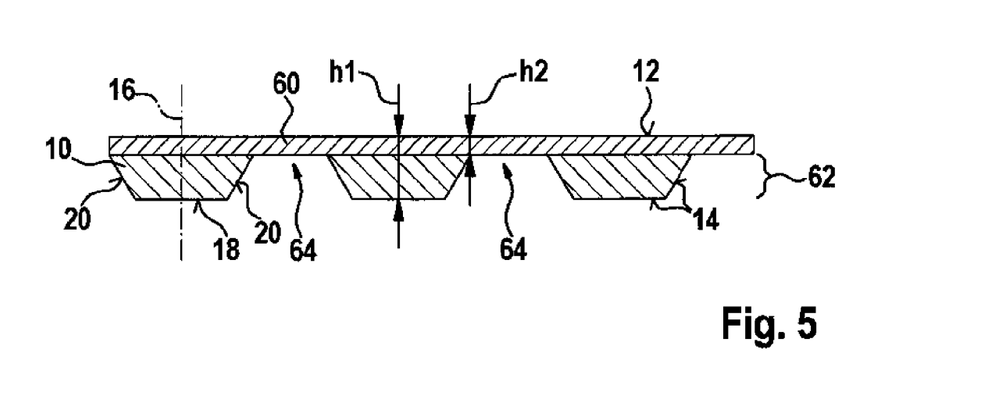
FIG. 5 shows a schematic cross section through a substrate for explaining one specific embodiment of the manufacturing method for at least one micromirror which is situatable or situated in a micromirror device.

FIG. 5 shows a schematic cross section through a substrate for explaining one specific embodiment of the manufacturing method for at least one micromirror which is situatable or situated in a micromirror device.

The manufacturing method includes the formation of a mirror side 12 of the at least one micromirror 10. In the specific embodiment of FIG. 5, mirror side 12 of the at least one micromirror 10 is covered with a reflective coating 60. Alternatively or additionally, mirror side 12 may also be polished.

Moreover, a back side 14, which is directed away from mirror side 12, of the at least one micromirror 10 is shaped/formed. The formation of back side 14 of the at least one micromirror 10 may take place prior to, during or after the formation of mirror side 12 of the at least one micromirror 10.

During the formation of back side 14, at least one surface 18 which is plane parallel to mirror side 12 is shaped in a central area of back side 14. Moreover, back side 14 is shaped in such a way that on two opposite sides of the central area, a side area which has at least one side surface 20 of back side 14 in each case, which is curved and/or oriented inclined toward mirror side 12, borders on the central area of back side 14. The at least one micromirror 10 is shaped in such a way that a height of micromirror 10 continuously decreases starting from the central area along a cross section, which runs through the central area and the two side areas, of respective micromirror 10. For example, the at least one micromirror 10 is shaped in such a way that a height of the cross section of respective micromirror 10 constantly has a first value h1 along a first section running through the central area and decreases continuously/constantly from first value h1 to a smaller, second value h2 along a second section which follows the first section and runs through a side area. Reference is made to the descriptions above with regard to possible shapes of back side 14 of the at least one manufactured micromirror 10.

The at least one micromirror 10 may be designed symmetrically with regard to a plane of symmetry 16 which intersects mirror side 12 and back side 14. The symmetric design of the micromirror represented in FIG. 5 is, however, to be interpreted only as an example.

In particular, a plurality of micromirrors 10 may be formed simultaneously with the aid of the manufacturing method. This takes place, for example, by applying reflective coating 60 to a front side of a silicon substrate 62; subsequent mirror sides 12 are situated on the front side of silicon substrate 62. The structuring of back sides 14 of subsequent micromirrors 10 out of silicon substrate 62 is started only afterward in the specific embodiment of FIG. 5.

For example, a plurality of micromirrors 10 is structured out of silicon substrate 62 during the shaping of back side 14, which is schematically illustrated in FIG. 5, a trench 64 running through silicon substrate 62 being structured between two adjacent micromirrors 10 in each case. Micromirrors 10 only remain connected to one another via reflective coating 60.

For example, back-side etching is carried out to structure out back side 14. In the specific embodiment of FIG. 5, back side 14 of all micromirrors 10 is etched out of silicon substrate 62 by using KOH (potassium hydroxide). Thus, 111 crystal planes may be automatically exposed as side surfaces 20 simply by covering subsequent plane-parallel surfaces 18 with an etch protective layer/mask. The etch protective layer may be subsequently removed.

An SOI wafer may, however, also be used as an alternative to silicon substrate 62. Moreover, silicon substrate 62 may have an implanted etch stop layer in one refinement of the approach in FIG. 5. In this case, outer surfaces are also shaped (in addition to plane-parallel surfaces 18 and side surfaces 20) on each side of the two side areas of a micromirror 10 which is directed away from the central area, an outer surface which is plane parallel to mirror side 12 bordering in each case on the two side areas of back side 14. The height of each micromirror 10 has, for example, constant second value h2 along a third section of the cross section which follows the adjacent second section and runs through the particular outer surface. In this case, second value h2 may correspond to a layer thickness of a semiconductor layer of the SOI wafer or to a distance of the implanted etch stop layer from mirror side 12.

It is pointed out that all the above-described specific embodiments of micromirror 10 are manufacturable with the aid of the manufacturing method (adapted, if necessary). The practicability of the manufacturing method is, however, not limited to the manufacture of the above-described specific embodiments of micromirror 10.

Figure 6A:
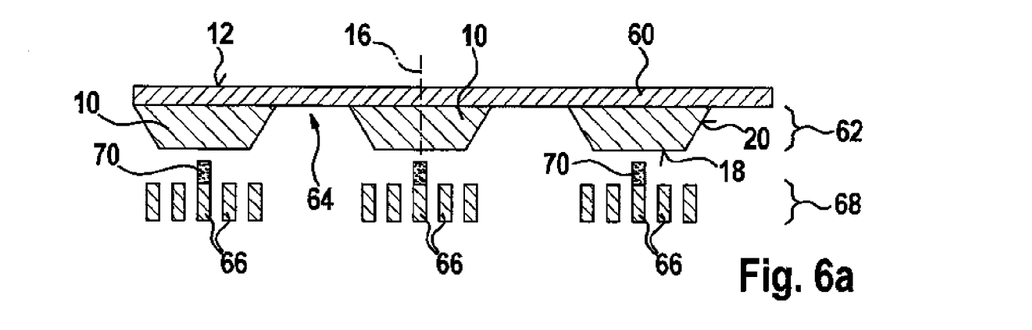
FIGS. 6a through 6c show schematic cross sections through substrates for explaining one specific embodiment of the manufacturing method for a micromirror device.
Figure 6B:
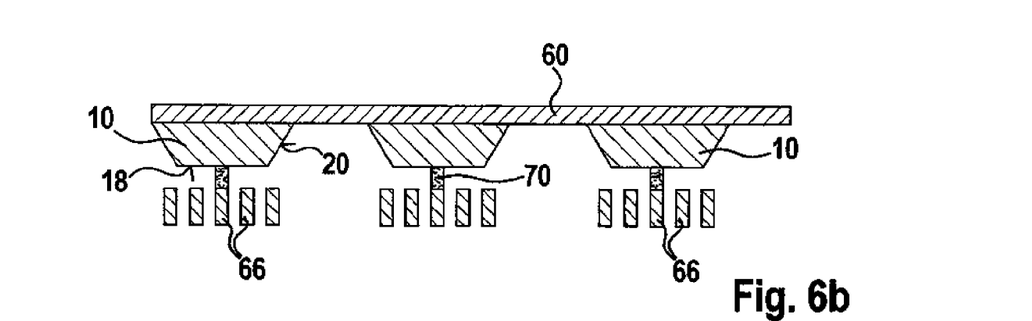
Figure 6C:
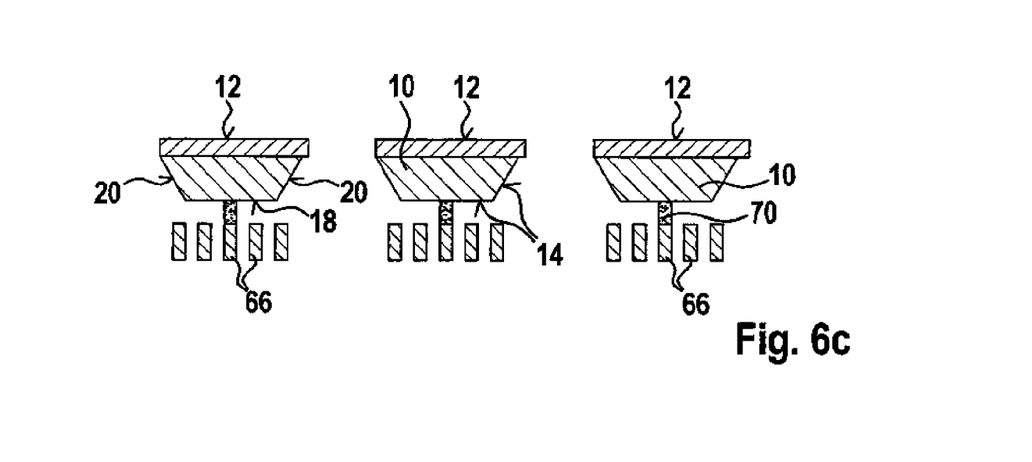

FIGS. 6a through 6c show schematic cross sections through substrates for explaining one specific embodiment of the manufacturing method for a micromirror device.

The manufacturing method includes the formation of at least one micromirror 10 of the micromirror device according to the previously described method. All the above-described method steps may be used/applied for this purpose.

In addition to the at least one micromirror 10, the subsequent micromirror device also has at least one spring 66 and a holder (not illustrated) at which the at least one micromirror 10 is connected via the at least one spring 66. In particular, the respective micromirror 10 is fastened at its at least one assigned spring 66 in such a way that micromirror 10 is displaced about at least one predefined axis of rotation in relation to the holder with the aid of a force applied thereto during a subsequent operation of the micromirror device.

As is apparent with reference to FIG. 6a, the at least one spring 66 and the assigned holder of each micromirror 10 may be structured out of another substrate 68, e.g., a silicon substrate, separately from micromirror 10, which will subsequently be connected thereto. Here, too, a plurality of springs 66 and holders may be manufactured at the same time. Since the appropriate method steps for structuring springs 66 and the assigned holders out of substrate 68 are known, they are not discussed here in greater detail. The at least one spring 66 and/or at least subareas of the holder may be shaped from the same material as assigned micromirror 10. Alternatively, the at least one spring 66 and/or the holder may, however, also be made of a different material.

A joining mass 70, via which the at least one spring 66 is connected to assigned micromirror 10 in a next method step, is preferably applied to the at least one spring 66 which is structured out of substrate 68. For example, the at least one spring 66, as illustrated schematically in FIG. 6b, is subsequently fixedly bonded anodically or eutectically at back side 14 of assigned micromirror 10. The fastening of the respective micromirror 10 at its at least one assigned spring 66 preferably takes place prior to a separation of micromirrors 10/springs 66.

By etching away excess material of reflective coating 60, the micromirror devices may be subsequently separated. This is illustrated schematically in FIG. 6c. A thickness of reflective coating 60 may be comparably thin, so that the final trenching process for separating the micromirror devices may be carried out within a comparably short time interval.

In another specific embodiment, the shaping of back side 14 may also take place by molding micromirror 10 from a sodium-containing glass. Subsequently, the at least one spring 66 may be fixedly anodically bonded at back side 14. Since the thermal properties of sodium-containing glass are similar to those of silicon, a micromirror device having a micromirror 10 which is molded from the sodium-containing glass and at least one spring 66 made of silicon may be successfully used in an environment in which temperature fluctuations occur.

All manufacturing methods described above may be carried out easily and cost-effectively in the wafer composite.

What is claimed is:

1. A micromirror for a micromirror device, comprising:
   a mirror side which is at least one of covered with a reflective coating and polished; and
   a back side which is directed away from the mirror side, the back side including:
   at least one central area having at least one surface which is plane parallel to the mirror side,
   side areas on two opposite sides of the central area, each side area having at least one side surface of the back side that is at least one of curved and oriented inclined toward the mirror side, and
   at least one outer surface which is plane parallel to the mirror side and borders on a side of at least one of the side areas,
   wherein a height of the micromirror decreases starting from the central area along a cross section of the micromirror which extends through the central area and the side areas.

2. The micromirror as recited in claim 1, wherein a first section of the cross section which is limited to the central area has a first length which is at least 20% of a total length of a total section of the cross section.

3. The micromirror as recited in claim 1, wherein the micromirror is structured out of a silicon substrate, and the side surfaces of the back side are 111 crystal planes.

4. The micromirror as recited in claim 1, wherein the back side further includes at least one of a front area and a back area on at least one of two further opposite sides of the central area, the at least one of the front area and back area having at least one surface of the back side that is at least one of curved and oriented inclined toward the mirror side.

5. A micromirror device, comprising:
   at least one micromirror including:
      a mirror side which is at least one of covered with a reflective coating and polished; and
      a back side which is directed away from the mirror side, the back side including:
         at least one central area having at least one surface which is plane parallel to the mirror side,
         side areas on two opposite sides of the central area, each side area having at least one side surface of the back side that is at least one of curved and oriented inclined toward the mirror side, and
         at least one outer surface which is plane parallel to the mirror side and borders on a side of at least one of the side areas,
      wherein a height of the micromirror decreases starting from the central area along a cross section of the micromirror which extends through the central area and the side areas;
   a holder; and
   at least one spring via which the micromirror is connected to the holder in such a way that the micromirror is displaceable about at least one predefined axis of rotation in relation to the holder with the aid of a force which is applied to the micromirror by an actuator.

6. The micromirror device as recited in claim 5, wherein the at least one spring is anchored at the back side of the micromirror.

7. A manufacturing method for at least one micromirror, the method comprising:
   forming a mirror side of the micromirror, the mirror side being at least one of covered with a reflective coating and polished; and
   forming a back side of the micromirror which is directed away from the mirror side, the back side including:
      at least one central area having at least one surface which is plane parallel to the mirror side
      side areas on two opposite sides of the central area, each side area having at least one side surface of the back side that is at least one of curved and oriented inclined toward the mirror side, and
      at least one outer surface which is plane parallel to the mirror side and borders on at least one side of the side areas,
   wherein a height of the micromirror decreases starting from the central area along a cross section of the micromirror which extends through the central area and the side areas.

8. The manufacturing method as recited in claim 7, wherein the shaping of the back side takes place by etching the back side out of one of a silicon substrate or an SOI wafer.

9. The manufacturing method as recited in claim 8, wherein the etching of the back side out of one of the silicon substrate or the SOI wafer takes place by using potassium hydroxide.

10. The manufacturing method as recited in claim 8, wherein the etching of the back side takes place one of out of the silicon substrate having an implanted etch stop layer or out of the SOI wafer.

11. A manufacturing method for a micromirror device, comprising:
   forming at least one micromirror including:
      forming a mirror side of the micromirror, the mirror side being at least one of covered with a reflective coating and polished; and
      forming a back side of the micromirror which is directed away from the mirror side, wherein at least in one central area of the back side, at least one surface which is plane parallel to the mirror side is shaped, and on two opposite sides of the central area, a side area having at least one side surface of the back side is shaped, which is at least one of curved and oriented inclined toward the mirror side,
      wherein a height of the micromirror decreases starting from the central area along a cross section of the micromirror which extends through the central area and the two side areas; and
   positioning the micromirror via at least one spring at a holder in such a way that the micromirror is displaceable about at least one predefined axis of rotation in relation to the holder with the aid of a force applied to the micromirror during operation of the micromirror device, wherein the at least one spring is fixedly bonded anodically or eutectically at the back side of the micromirror.

12. The manufacturing method as recited in claim 11, wherein the at least one spring is fixedly bonded anodically at the back side of the micromirror which is molded from a sodium-containing glass.

13. A micromirror for a micromirror device, comprising:
   a mirror side; and
   a back side facing in a direction substantially opposite to that of the mirror side, the back side including:
      at least one central area,
      at least one side area on at least one of two opposite sides of the central area, the at least one side area having at least one side surface of the back side that is at least one of curved and oriented inclined toward the mirror side,
      at least one of a front area and a back area on at least one of two further opposite sides of the central area, the at least one of the front area and back area having at least one surface of the back side that is at least one of curved and oriented inclined toward the mirror side; and
      at least one outer surface that borders on a side of the at least one side area.

14. The micromirror as recited in claim 13, wherein a height of the micromirror decreases starting from the central area along a cross section of the micromirror which extends through the central area and the at least one side area.

15. The micromirror as recited in claim 13, wherein a height of the micromirror decreases starting from the central area along a cross section of the micromirror which extends through the central area and the at least one of the front area and the back area.

* * * * *